(12) United States Patent
Bhat et al.

(10) Patent No.: US 8,954,949 B2
(45) Date of Patent: Feb. 10, 2015

(54) SMART PATCH DELIVERY SYSTEM

(75) Inventors: B. G. Prashanth Bhat, Bangalore (IN); Madhu B. Ananthapadmanabh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 12/901,639

(22) Filed: Oct. 11, 2010

(65) Prior Publication Data

US 2012/0089973 A1    Apr. 12, 2012

(51) Int. Cl.
*G06F 9/44* (2006.01)

(52) U.S. Cl.
CPC .................................. *G06F 8/68* (2013.01)
USPC ......................................... 717/169; 717/170

(58) Field of Classification Search
USPC .......................................................... 717/169
See application file for complete search history.

(56) References Cited

U.S. PATENT DOCUMENTS

| | | | |
|---|---|---|---|
| 6,279,030 B1 | 8/2001 | Britton et al. | |
| 7,127,712 B1 | 10/2006 | Noble et al. | |
| 7,480,907 B1 * | 1/2009 | Marolia et al. | 717/174 |
| 2003/0182414 A1 * | 9/2003 | O'Neill | 709/223 |
| 2003/0212990 A1 | 11/2003 | Brodkorb et al. | |
| 2006/0064685 A1 * | 3/2006 | DeFolo | 717/169 |
| 2007/0006209 A1 | 1/2007 | Nguyen et al. | |
| 2007/0113225 A1 | 5/2007 | Felts | |
| 2008/0072219 A1 | 3/2008 | Kabadiyski | |
| 2008/0163192 A1 * | 7/2008 | Jha et al. | 717/173 |
| 2009/0144716 A1 | 6/2009 | Felts | |
| 2009/0150851 A1 * | 6/2009 | Boer et al. | 717/100 |
| 2011/0173599 A1 * | 7/2011 | Ohama et al. | 717/168 |

OTHER PUBLICATIONS

Previtali-Cech, Susanne. "Dynamic updating of object-oriented software systems based on aspects", ETH (2009). doi:10.3929/ethz-a-005938293. Relevant Passages: Abstract and Section 2.3.1 Classes.
"Soot: a Java Optimization Framework", Mar. 29, 2010, http://www.sable.mcgill.ca/soot/.
P. Pominville et al., "A Framework for Optimizing Java Using Attributes", IBM Centre for Advanced Studies Conference, Proceedings of the 2000 Conference, 2000, pp. 1-21.

* cited by examiner

*Primary Examiner* — Li B Zhen
*Assistant Examiner* — Joanne Macasiano
(74) *Attorney, Agent, or Firm* — A. Bruce Clay

(57) ABSTRACT

Software fix packs and/or APAR's are maintained at a server for use on a requesting computer system. The requesting computer system makes a request for a specific APAR, which is identified by a version number, from the server. The server determines, by examining the requesting computer's request, whether the requesting computer system has all required software dependencies for the requested APAR. When it is determined what the requesting computer systems needs, the server bundles the requested APAR and any required software dependencies, not already on the requesting computer system, for shipment to the requesting computer system.

12 Claims, 8 Drawing Sheets

1

SMART PATCH DELIVERY SYSTEM

BACKGROUND

The present invention relates, in general, to software repair, and more specifically, to a smart software patch delivery system.

Java® (Java is a registered trademark of Oracle and/or its affiliates) has become one of the most widely used software platforms. A Java application is usually shipped as a set of jar files. These .jar files in-turn contain compiled class files in an intermediate bytecode format. A typical enterprise application can be as complex as having 100's of jar files, and each jar file can have more than 1000 class files.

If software needs to be updated (repairs, new features, etc.), the updates for an enterprise application are sent as individual fixes to start with, and eventually rolled up into a bundle as a Service Release or Fix Pack. Service Releases or Fix Packs are unscheduled releases comprising relatively few fixes, to address significant issues discovered between regularly scheduled Maintenance Releases. Customers can either download specific fixes which they are interested in, or they can download a Fix Pack. The framework to download these updates should be user friendly and easy to maintain.

Frameworks store prepackaged bundles of Fix Packs and individual fixes, known as Authorized Program Analysis Report (APAR's) on a server. A readme file containing details of the fixes, for example, problem description or dependency, will also be part of the download. Though this framework looks good, it is not user friendly when it comes to handling patch dependencies. Dependency handling is done on the customer system and not at the time of download. The patch installer will check what is installed on the system and what else is missing before installing a patch. Thus, a customer downloading a patch will not have any information about its dependencies unless he/she reads the readme file or tries to install the patch. The situation can get worse with recursive dependencies. After downloading the dependent fixes separately, one also needs to remember the order of installation.

BRIEF SUMMARY

According to one embodiment of the present invention, a method processes software repairs at a remote computer system for use on a requesting computer system interconnected thereto, by an electronic network. The remote computer system receives at least one software repair request identified by a first version number. It is determined, at the remote computer system, whether the requesting computer system has required software dependencies for the requested software repair. The software repair and required software dependencies are bundled for shipment to the requesting computer system over the electronic network.

According to one embodiment of the present invention, a computer system processes software repairs at a remote computer system for use on a requesting computer system. The computer system comprises a processor and memory connected to the processor, wherein the memory is encoded with instructions. When the instructions are executed, the remote computer system receives at least one software repair which is identified by a first version number. It is determined, at the remote computer system, whether there are required software dependencies for the software repair. The software repair and required software dependencies are bundled for shipment to the requesting computer system over the electronic network.

According to one embodiment of the present invention, a computer program product processes software repairs at a remote computer system for use on a requesting computer system. The computer program product comprises a computer readable storage medium having computer readable program code embodied therewith. The computer readable program code is configured to receive at the remote computer system, at least one software repair, identified by a first version number. Computer readable program code is configured to determine, at the remote computer system, whether there are required software dependencies for the software repair. The computer readable program code is configured to bundle the software repair and the required software dependencies for shipment to the requesting computer system over the electronic network.

DETAILED DESCRIPTION

Figure 1:
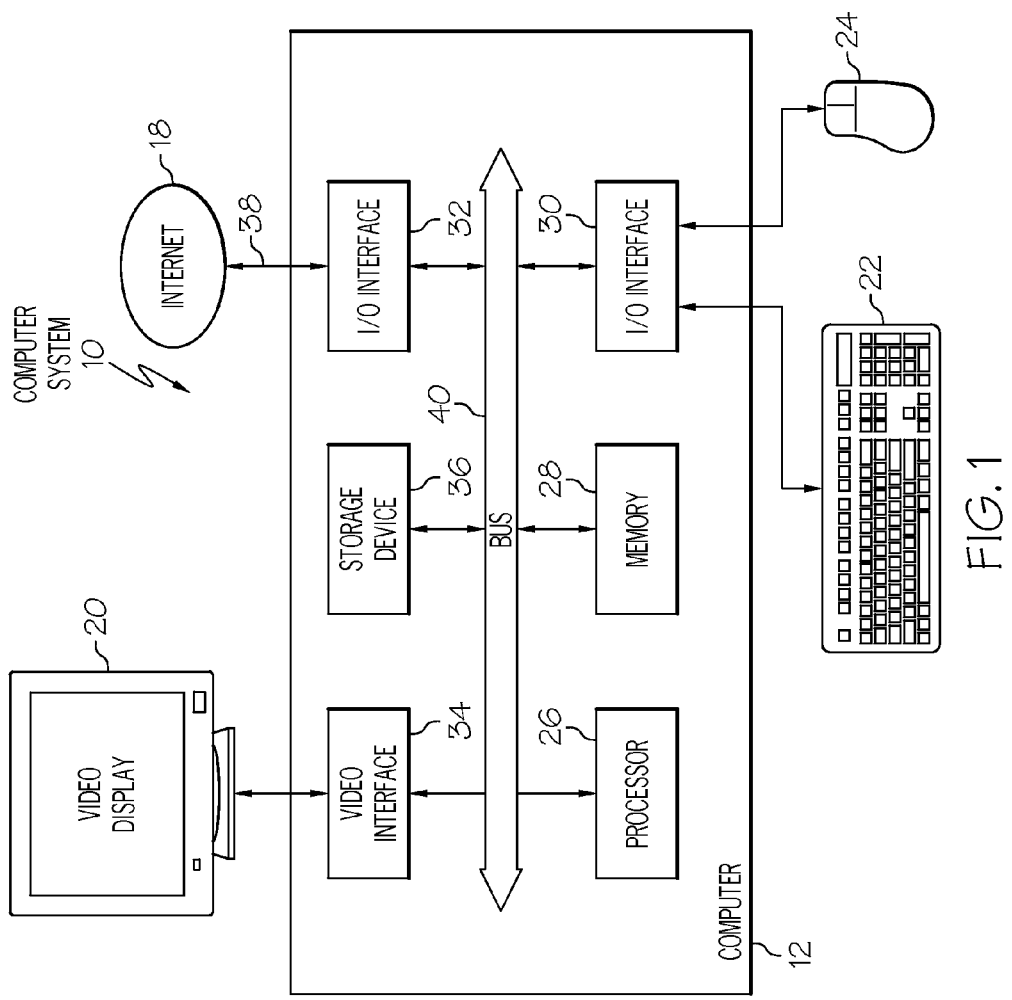
FIG. 1 is a block diagram of a computer system which is suitable for implementing an embodiment of the present invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for a smart patch delivery system. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

After a software product has been released, any subsequently identified errors, flaws, mistakes, failures, or faults (collectively, bugs) that produce an incorrect or unexpected result, or cause the product to behave in unintended ways that are encountered in the field are reported to the product owner. As these errors are repaired, they are published for download as software repairs commonly identified as patches or Authorized Program Analysis Reports (APARs). A number of APARs may be accumulated and packaged into a Fix Pack (or Service Pack).

Figure 2:
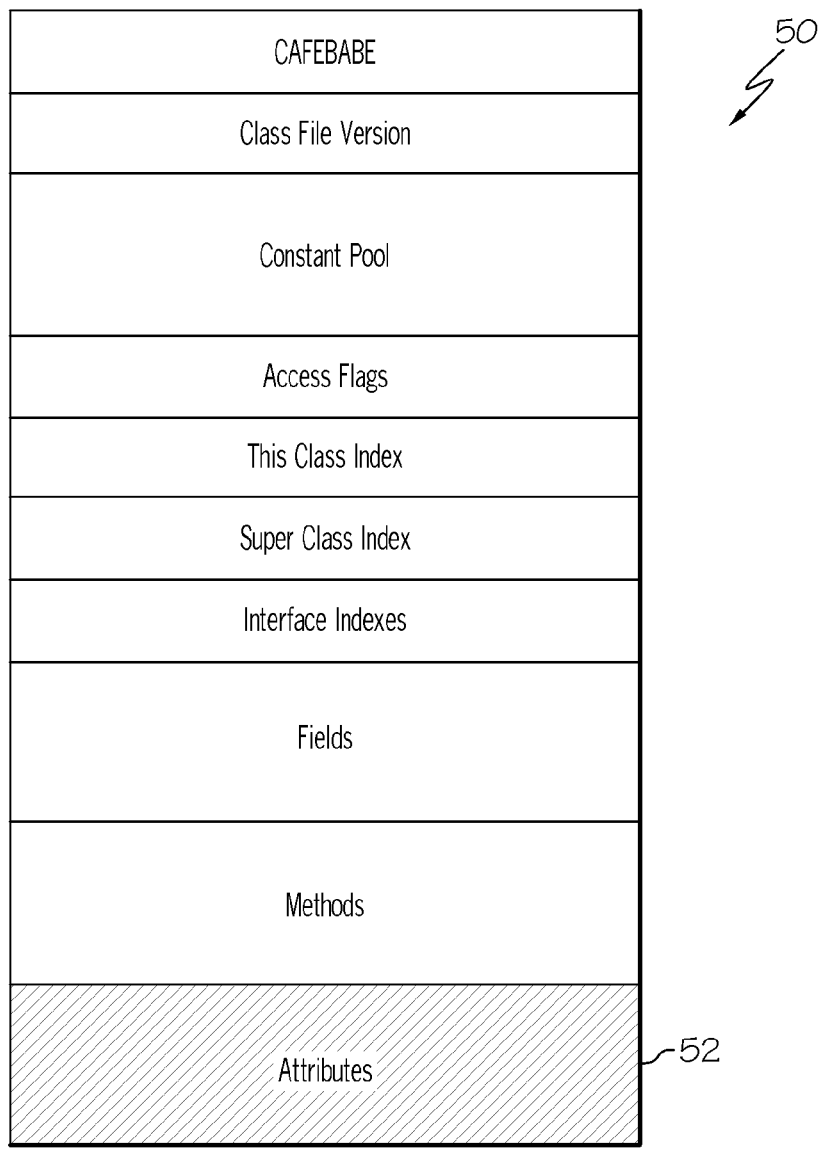
FIG. 2 illustrates a Java Class file structure.

An APAR can contain 1 or more class files. The Java Class file structure 50, as shown in FIG. 2, has a place holder for storing Name value pairs. These are called Class file attributes, as indicated by reference numeral 52. In an embodiment of the present invention, each Class file will have the following name value pairs stored as class file attributes:

1. Version Number (version control information corresponding to the class file):
   A class file may be updated as part of multiple APARs. Every time a class file is updated, its version number is incremented. If a class file is common across many dependent APARS, version number is used to identify and ship only the latest class file.
2. APAR numbers:
   This is a list of all APARs to which a class belongs. After each patch is built the APAR number is appended to this list.
3. Target jar file:
   This information is used to locate and update the target jar file on the client side.

Figure 3:
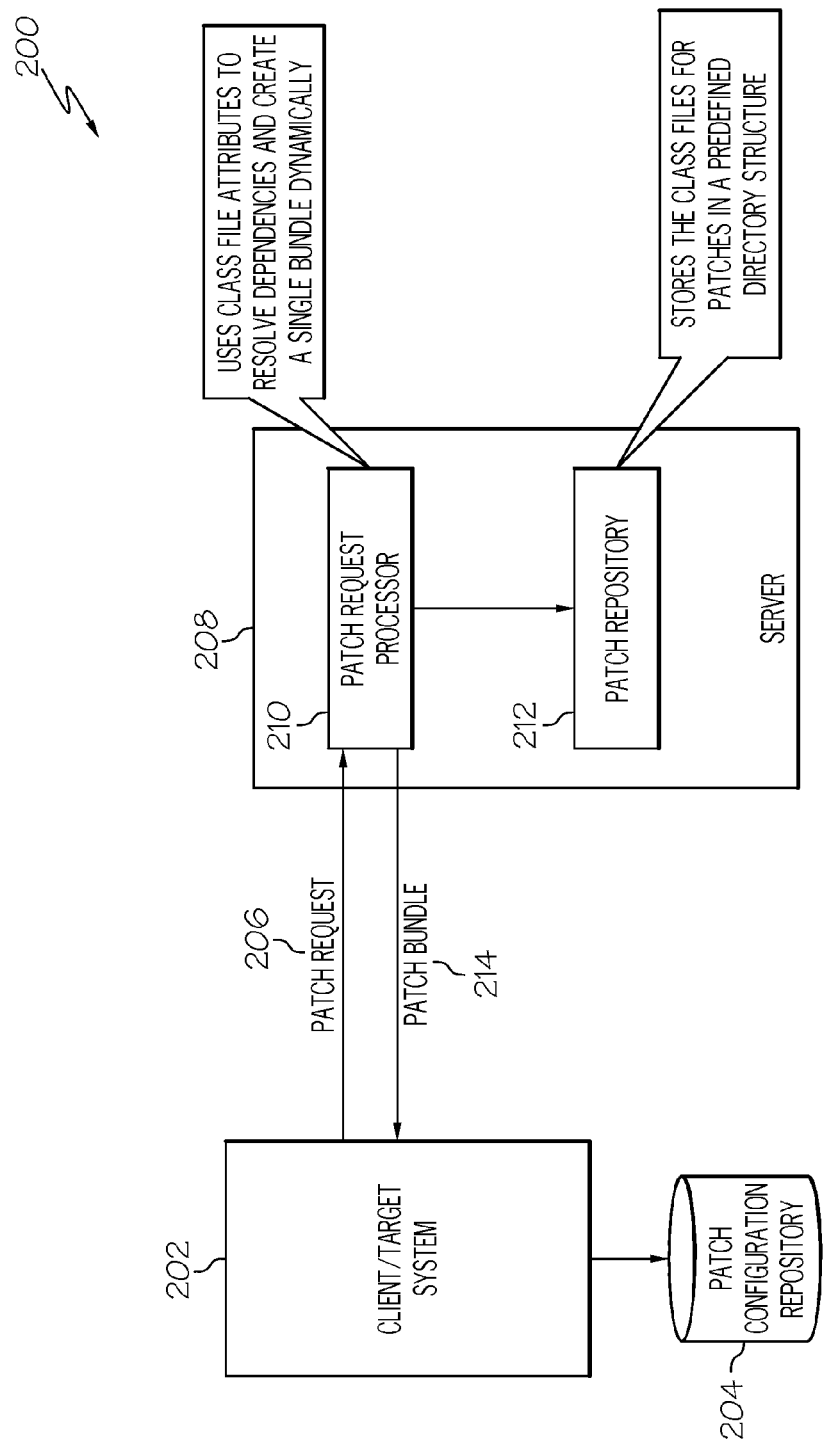
FIG. 3 is a block diagram illustrating a high level embodiment of the present invention.

FIG. 3 illustrates a high level architecture of one embodiment of the present invention. A Patch Delivery Framework 200 is depicted as a client server model. The Client/Target System 202 has a Patch Configuration repository 204, which contains the current patch level information for the System 202, for example, in the following format:

```
<Product>
    <Name > Product Name </Name>
    <Product Version Number> 6.1 </Product Version Number>
    < FixPack Number> 1 </FixPack Number>
    <APAR>APAR 3</APAR>
    ...
</Product>
```

The System 202 makes a Patch request 206 for a desired up-level patch. Along with the request 206, the current patch level information from the repository 204 is sent to a server 208. The server 208 comprises a Patch request processor 210 and a Patch repository 212. Based on the current patch information in the Patch Configuration repository 204 and the Patch request 206, dependencies, if any, are resolved, therebetween. The Patch request processor 210 uses the class file attributes (see FIG. 2) to resolve dependencies and dynamically create a single bundle for return and installation on the system 202. The Patch repository 212 stores the class files for patches in a pre-defined directory structure, such as:

```
Product/
    Version/
        FixPack 1/
            APAR 1/
                Package/Class Files
            APAR 2/
                Package/Class Files
        FixPack 2/
            APAR 3/
                Package/Class Files
        FixPack Next
            APAR 4/
                Package/Class Files
```

The above structure indicates that APAR 1 and APAR 2 are already bundled as part of Fix Pack 1. Fix Pack 2 has been made available with APAR 3, and Fix Pack Next is an upcoming Fix Pack which has not yet shipped. While Fix Pact Next has not yet been finalized for shipment, APAR 4 has been finalized and is available for shipment.

When a request 206 is received, the server 208 compares the client's current patch information (available in the request 206) with the requested patch level on the server 208. The comparison, which will be subsequently described in greater detail, determines if dependencies required by the up-level patch are installed on the system 202. As a result, the additional dependencies, if any, are bundled with the up-level patch and sent to the system 202 as a Patch bundle 214 for installation.

Figure 4:
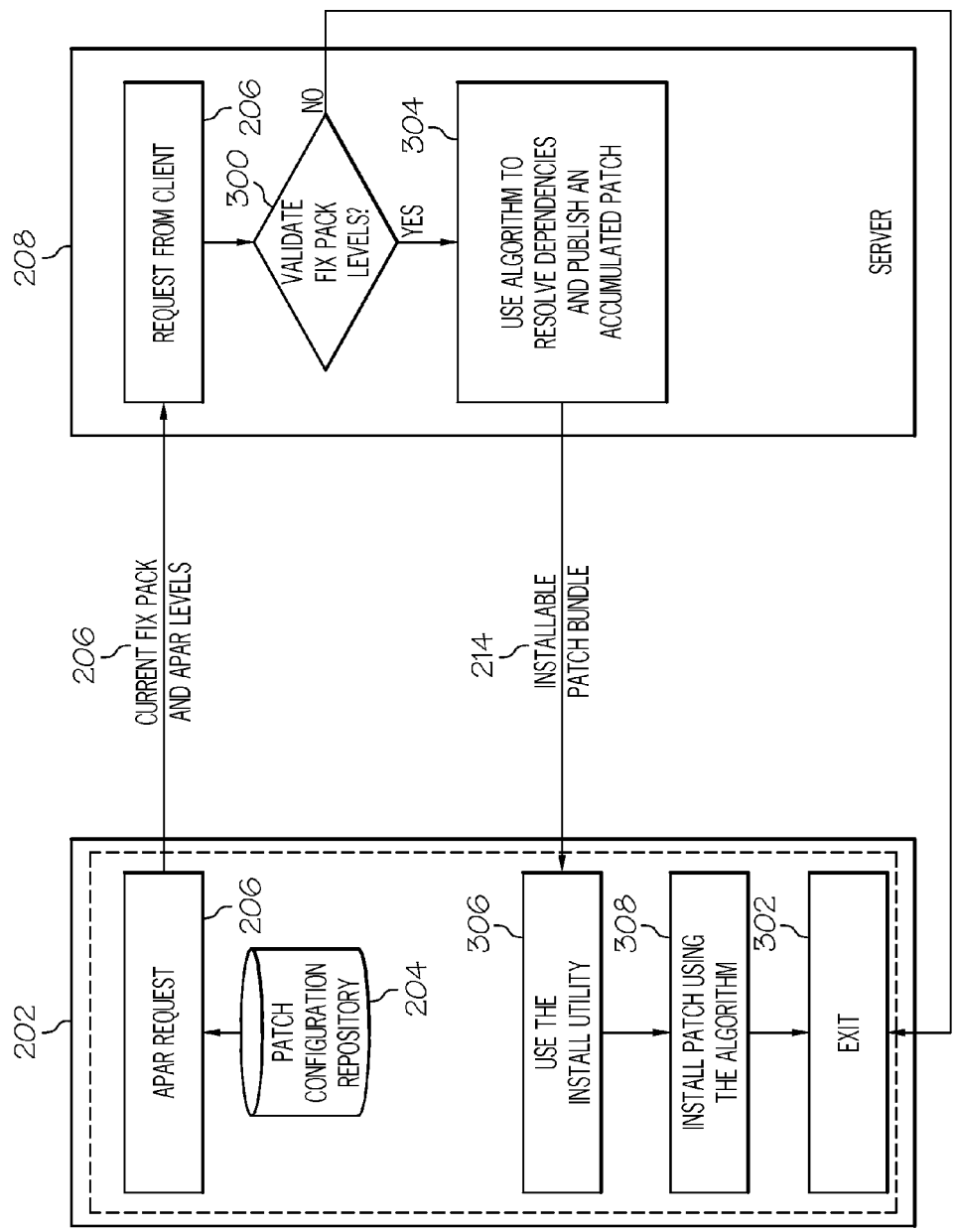
FIG. 4 is a high level flow diagram of an embodiment of the present invention.

Referring to FIG. 4, wherein like items are identified with like reference numerals from FIG. 3, an embodiment of the invention, as shown in FIG. 3, is further described in greater detail. An APAR request with the current level information, collectively identified by reference numeral 206, is transmitted to the server 208. At a decision point 300, it is determined whether the fix pack levels can be validated (current level sufficient to properly utilize the requested level). If the response to decision point 300 is no, the process Exits at 302.

Figure 5:
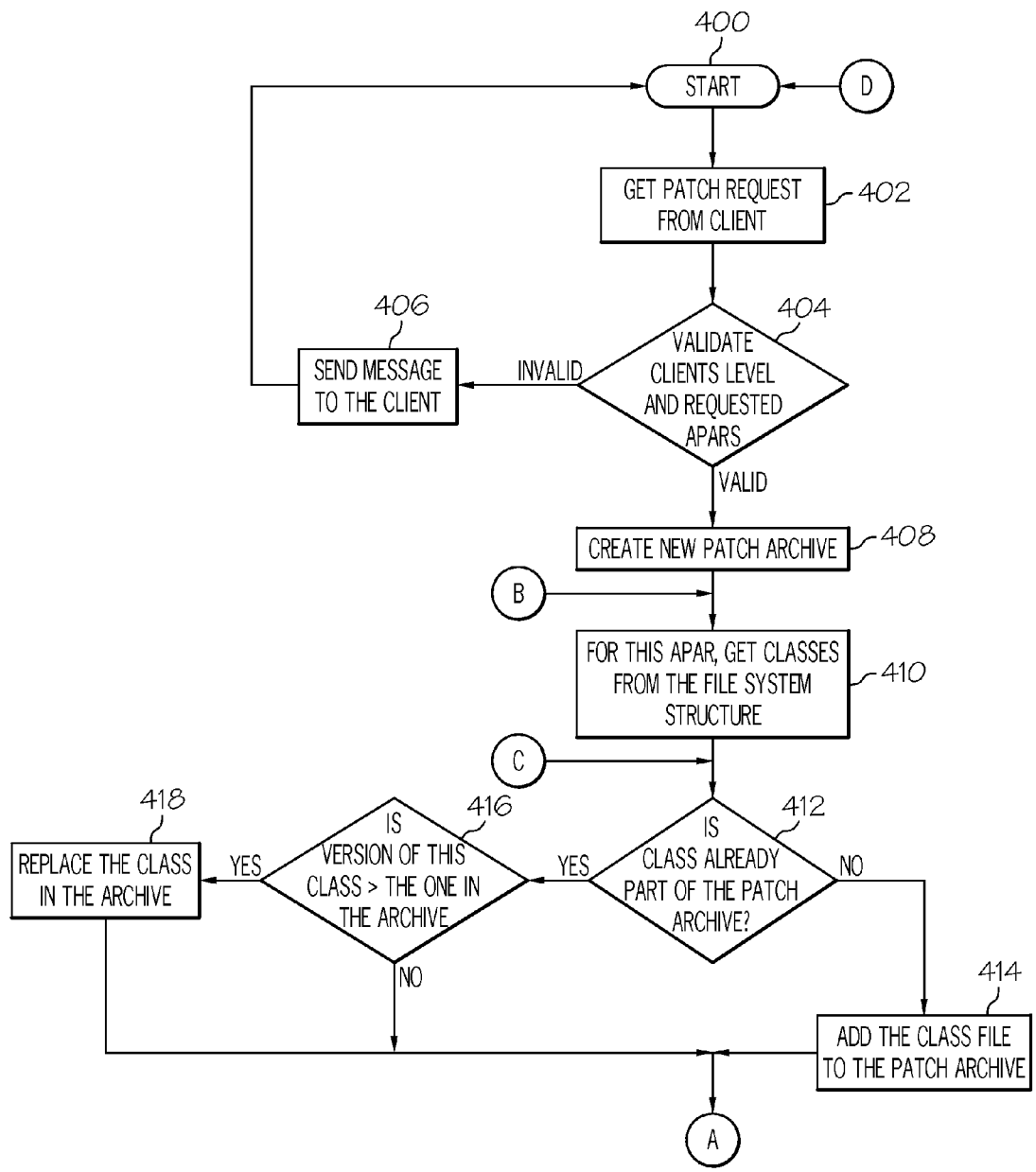
FIGS. 5 and 6 are flow charts illustrating a server side algorithm of an embodiment of the present invention.
Figure 6:
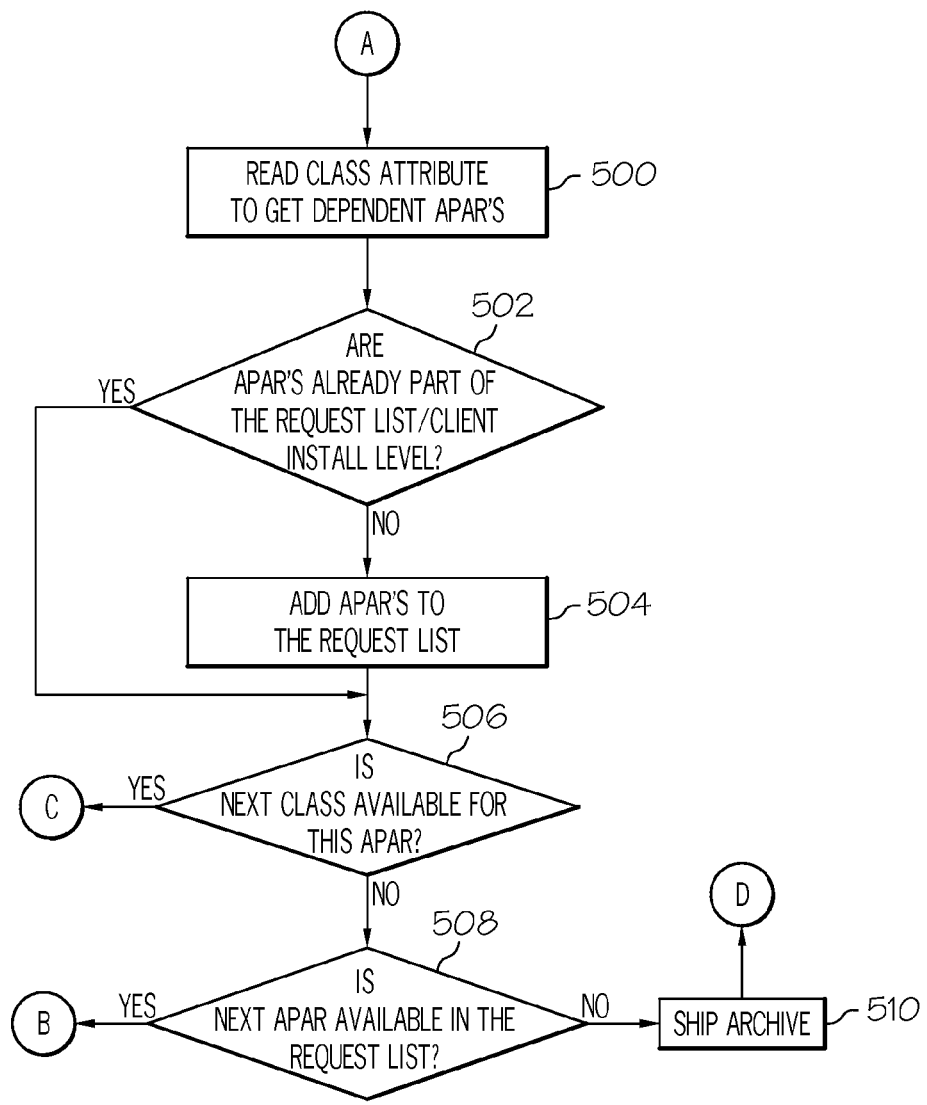

If the response to decision point 300 is yes, at 304, a server side algorithm, as will be discussed in greater detail with reference to FIGS. 5 and 6, is used to resolve dependencies and an accumulated patch is published. The Installable Patch Bundle 214 is sent to the system 202 where it is processed by an install utility at 306. At 308, the patch bundle 214 is installed using the client side algorithm, as will be subsequently described below, in accordance with an embodiment of the present invention. The process then ends at 302.

A server side algorithm which is used to resolve dependencies and create an installable patch bundle will now be discussed with reference to FIGS. 5 and 6. As an example, the following scenario will be used (information related to this example will be placed between brackets [ ] in the discussion of the illustrations):

If the client is looking for APAR 4 and his current level is Fix Pack 1, then the following information is sent to the server as part of the request along with the requested APAR, i.e. APAR 4:

```
<Product>
    <Name > Product Name</Name>
    <Product Version Number> 6.1 </Product Version Number>
    < FixPack Number> 1 </FixPack Number>
</Product>
```

On the server side, let us assume the following structure:

```
Product/
    Version/
        FixPack 1/
            APAR 1/
                Package/Class A
                Package/Class B.1
            APAR 2/
                Package/Class B.2
                Package/Class D
        FixPack 2/
            APAR 3/
                Package/Class C
        FixPack Next
            APAR 4/
                Package/Class B.3
```

According to this scenario, the Class B.3 (APAR 4) will have the following class file attributes:

Version=3 (it has been updated 3 times as part of 3 different APARs);
APAR=4,2,1 (APAR numbers which ship this class); and
TargetJar=sample.jar (the place holder for this class on the client machine).

Referring first to FIG. 5, and using the above example the process starts at 400. At block 402, the patch request from the client is obtained [APAR 4]. At decision block 404, it is determined whether the client patch level is valid by comparing the client's Fix Pack version [Fix Pack 1] against the version with which the APAR is available [the requested APAR is at the next level 'FixPack Next']. If the client level is invalid, a message so informing the client is sent at block 406 and the process returns to start 400. For the client level to be valid, the following must be true:

Client current fix pack level ≤ requested fix pack level − 2

The following is sample code for validation:

```
validate_request( CurrentFixPackLevel, RequestedAPARVector)
{
    For each APAR in RequestedAPARVector,
    do
        APARs_FixPack_Level =
        get_fixpack_level(APARNumber)/* This returns the fix pack
        number from the directory structure */
            if ( CurrentFixPackLevel ≤ APARsFixPackLevel − 2 )/*
        This can be decided based on the service process */
            {
                return false
                return ( APARsFixPackLevel −2 )
            }
    done
    return true
}
```

If the client level is valid, a new blank patch archive (a blank place holder for later entry) is created at block 408. Using the example data above, the Client's current fix pack level is 1 [FixPack 1], which is less than or equal to the requested APAR's Fix Pack Level [in the given example, it is Fix Pack "Next" which will be FixPack 3 when shipped] minus 2 [1≤3−2], this is treated as a valid request. Classes for the requested APAR [APAR 4 includes only Class B.3] are obtained from the file system structure (server side repository 212 in FIG. 3 and as shown above) at block 410. It is then determined at decision block 412 if the class is already part of the patch archive. If the response to decision block 412 is no [Class B.3 is not part of the archive], the class file [Class B.3] is added to the patch archive at block 414. If the class is already part of the patch archive, it is determined at decision block 416 if the version of the class is newer than the one in the archive. If the response to decision block 416 is yes, the version in the archive (Class B.2) is replaced by the newer class (Class B.3) at block 418. Subsequent to block 414, block 418, or if the response to decision block 416 is no, the process flows through A to FIG. 6.

Referring now to FIG. 6, the class [Class B.3] attributes [version 3, APAR's 4, 2, and 1] are read to get the dependent APAR's [in this example, the requested APAR 4/Class B.3 needs Class A and D which are found in FixPack 1 containing APAR 1 and APAR 2] at block 500. It is then determined at decision block 502 whether the APAR's are already part of the request list/client install level [since APARs 1 and 2 are part of the client's current level and already in the APAR request list, APARs 1 and 2 do not need to be added to the APAR request List]. If the response to decision block 502 is no, the APAR's are added to the request list at block 504. If the response to decision block 502 is yes or subsequent to block 504, it is determined at decision block 506 if the next class is available for this APAR. If the response to decision block 506 is yes, the process returns to decision block 412 of FIG. 5. If the response to decision block 506 is no, it is determined at decision block 508 if the next APAR in the list is available. If the response to decision block 508 is yes, the process returns to block 410 in FIG. 5. If the response to decision block 508 is no, the archive is shipped at 510 and the process returns to 400 in FIG. 5.

The following is sample code for main patch archive creation routine:

```
create_patch( CurrentFixPackLevel, CurrentAPARVector, RequestedAPARVector)
{
    isValid = validate_request( CurrentFixPackLevel,RequestedAPARVector)
    if not ( is Valid)
    {
        return required_fix_pack_level       /* Give feedback that his current fix
        pack is outdated and he needs to install certain minimum level before this
        download */
    }
    package_and_publish(CurrentAPARVector, RequestedAPARVector)
}
package_and_publish(CurrentAPARVector, RequestedAPARVector)
{
    For each requested APAR in RequestedAPARVector and not in
    CurrentAPARVector
```

```
    do
        For each Class file in this APAR directory /* Refer to section 3.4 for
        directory structure information */
        do
            if not already added, Add class to the final archive to be delivered.
            /* The packaging structure is also maintained in the final archive */
            read the class attributes to get all the dependent APARs.
            recurse package_and_publish until ( dependent APAR = null )
        done
    done
    Final archive is made available for download.
}
```

Once the process of FIGS. 5 and 6 are completed, the following would be found in the patch archive:

Class B.3 (as part of APAR 4). Though there are multiple instances of Class B as part of APAR 4, 2 and 1, only one copy, i.e. the latest copy, B.3, is bundled in the patch archive.

Figure 7:
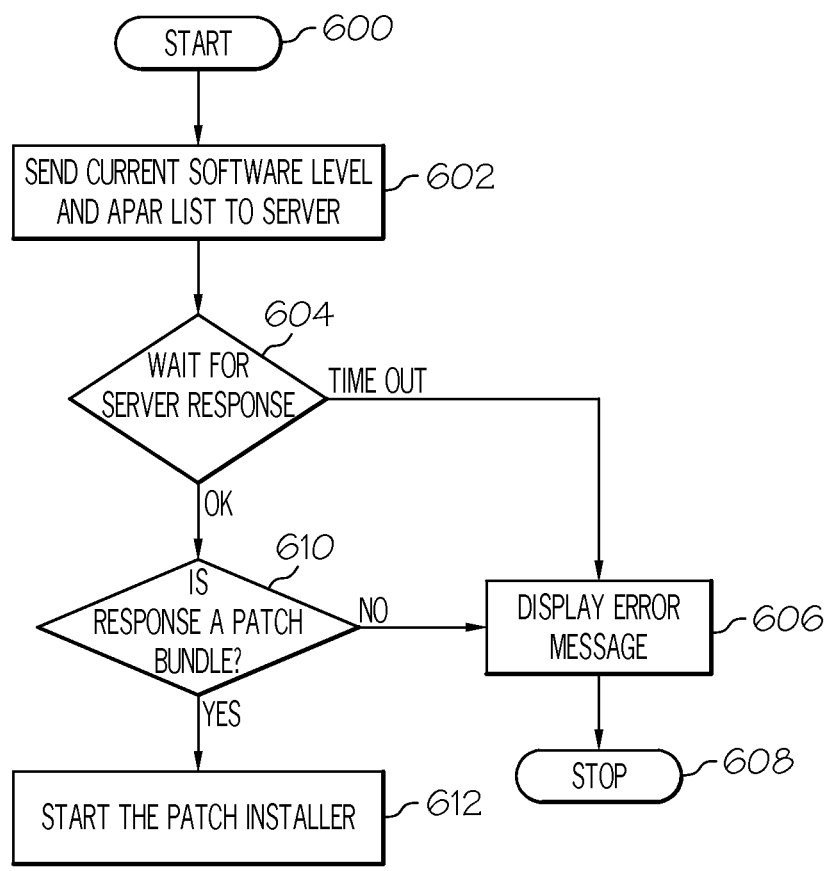
FIGS. 7 and 8 are flow charts illustrating a client side algorithm of an embodiment of the present invention.
Figure 8:
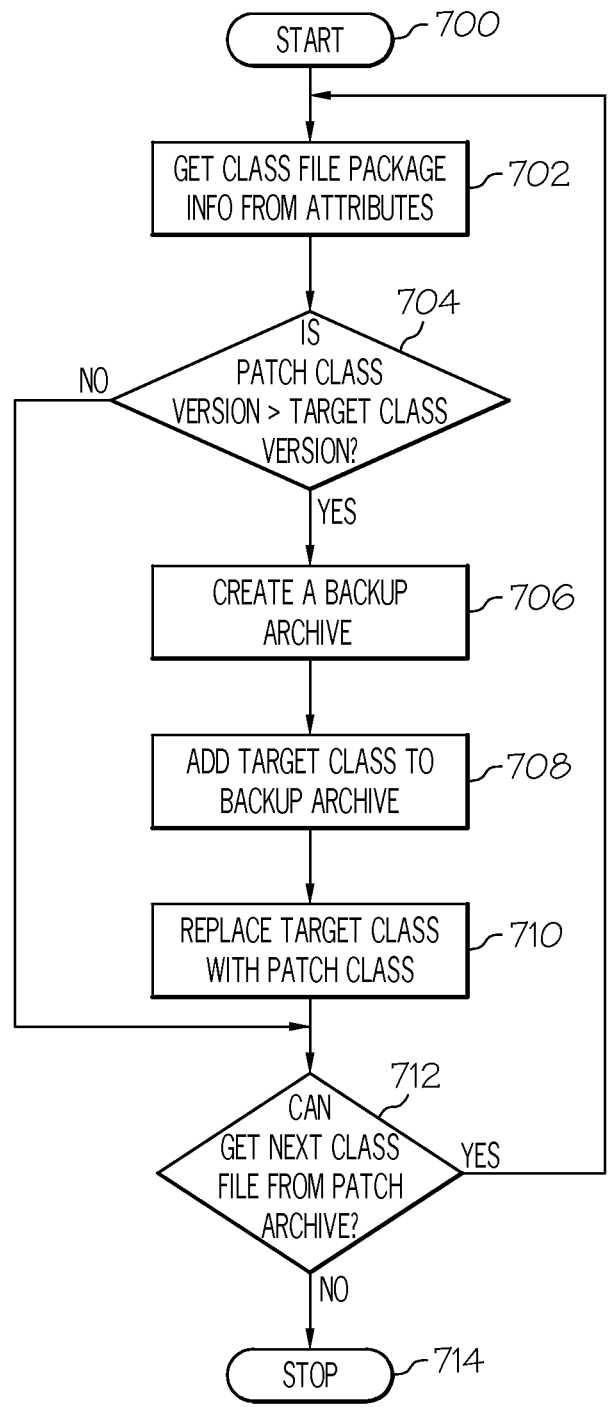

Referring now to FIGS. 7 and 8, the process flow of the client side algorithm is illustrated. The process starts at 600, as shown in FIG. 7. The current software level and APAR list is sent to the server at 602. At decision block 604, the process waits for a response from the server. If the response does not arrive within a predetermined time, the process times out, an error message is displayed at 606, and the process stops at 608.

If the server response is received within the predetermined time, it is determined at decision block 610 if the response is a patch bundle. If the response is no, an error message is displayed at 606 and the process ends at 608.

If the response to decision block 610 is yes, the patch installer is started at 612, and the process continues to start 700 in FIG. 8. At block 702, class file package information is obtained from attributes. At decision block 704, it is determined whether the patch class version is newer than the target's class version. If the response to decision block 704 is no, the process goes to decision block 712. If the response to decision block 704 is yes, a backup archive is created at 706 for storage in a memory, such as the storage device 36 in FIG. 1. The target class is added to the backup archive at block 708, and the target class is replaced by the patch class at 710.

It is then determined at decision block 712 if the next class file can be obtained from the patch archive. If the response to decision block 712 is no, the process ends at 714. If the response to decision block 712 is yes, the process returns to block 702.

The following code demonstrates the client side installation algorithm:

```
install_patch(patchArchive)
{
    For each class in the patchArchive
    do
        read the class attributes to get the target JAR file.
        create a backup of the existing class file.
        try
            update the target JAR with new class file
        catch
            restore backup for all the jar files updated so far.
            exit.
        end_try
    done
    Update the client configuration repository with latest APAR information.
}
```

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for processing software patch requests at a remote computer system, wherein a requesting computer system and the remote computer system are interconnected over an electronic network, comprising:

receiving, at the remote computer system, at least one software patch request from a client for a desired up-level patch identified by a first version number, wherein said at least one software patch request comprises the first version number, and wherein a current fix pack level at the requesting computer system is identified by a second version number;

approving said request, at the remote computer system, when it is determined that said current fix pack level can properly utilize, in accordance with a predefined algorithm at said remote computer system, said desired up-level patch identified by said first version number;

denying said request, at the remote computer system, and sending a message informing the client when it is determined that said current fix pack level cannot properly utilize said desired up-level patch, in accordance with said predefined algorithm at said remote computer system, wherein said request is denied when said first version number minus two is greater than or equal to said second version number and wherein said message comprises the first version number minus two;

at the remote computer system, determining from said request, using a processor, any required software dependencies for said desired up-level patch identified by said first version number not already present in said current fix pack level at the requesting computer system; and dynamically combining said desired up-level patch identified by said first version number with said any required software dependencies into a single bundle, containing said desired up-level patch and said required dependencies but excluding any of said required dependencies already installed on said requesting computer system, for shipment to the requesting computer system over the electronic network.

2. The method of claim 1, wherein said request further comprises said second version number of said current fix pack at the requesting computer system and the existence of requesting computer system software dependencies associated therewith.

3. The method of claim 1, further comprising, instructing the requesting computer system to store in a memory, all currently installed fix pack levels identified by version numbers and software dependency information thereto, as java class file attributes.

4. The method of claim 1, further comprising storing in a memory, on the remote computer system, available fix pack levels identified by version numbers and software dependency information thereto, as java class file attributes.

5. A computer system for processing software patch requests at a remote computer system, wherein a requesting computer system and the remote computer system are interconnected over an electronic network, comprising:
a processor; and
a memory connected to the processor, wherein the memory is encoded with instructions and wherein the instructions when executed comprise:
instructions for receiving, at the remote computer system, at least one software patch request from a client for a desired up-level patch identified by a first version number, wherein said at least one software patch request comprises the first version number, and wherein a current fix pack level at the requesting computer system is identified by a second version number;
instructions for approving said request, at the remote computer system, when it is determined that said current fix pack level can properly utilize, in accordance with a predefined algorithm at said remote computer system, said desired up-level patch identified by said first version number;
instructions for denying said request, at the remote computer system, and sending a message informing the client when it is determined that said current fix pack level cannot properly utilize said desired up-level patch, in accordance with said predefined algorithm at said remote computer system, wherein said request is denied when said first version number minus two is greater than or equal to said second version number and wherein said message comprises the first version number minus two;
instructions for determining, from said request, at the remote computer system, whether there are any required software dependencies for said desired up-level patch identified by said first version number not already present in said current fix pack level at the requesting computer system; and
instructions for dynamically combining said desired up-level patch identified by said first version number with said any required software dependencies into a single bundle, containing said desired up-level patch and said required dependencies but excluding any of said required dependencies already installed on said requesting computer system, for shipment to the requesting computer system over the electronic network.

6. The computer system of claim 5, further comprising instructions for adding to said request said second version number of said current fix pack at the requesting computer system and the existence of requesting computer system software dependencies associated therewith.

7. The computer system of claim 5, further comprising instructions for storing, in a memory on the requesting computer system, all currently installed fix pack levels identified by version numbers and any software dependency information thereto, as java class file attributes.

8. The computer system of claim 5, further comprising instructions for storing, in a memory on the remote computer system, available fix pack levels identified by version numbers and software dependency information as java class file attributes.

9. A computer program product for processing software patch requests at a remote computer system, wherein a requesting computer system and the remote computer system are interconnected over an electronic network, the computer program product comprising a non-transitory computer readable storage medium having computer readable program code embodied therewith, the computer readable program code comprising:
computer readable program code configured to receive, at the remote computer system, at least one software patch request from a client for a desired up-level patch identified by a first version number, wherein said at least one software patch request comprises the first version number, and wherein a current fix pack level at the requesting computer system is identified by a second version number;
computer readable program code configured to approve said request, at the remote computer system, when it is determined that said current fix pack level can properly utilize, in accordance with a predefined algorithm at said remote computer system, said desired up-level patch identified by said first version number;
computer readable program code configured to deny said request, at the remote computer system, and sending a message informing the client when it is determined that said current fix pack level cannot properly utilize said desired up-level patch, in accordance with said predefined algorithm at said remote computer system, wherein said request is denied when said first version number minus two is greater than or equal to said second version number and wherein said message comprises the first version number minus two;
computer readable program code configured to determine, at the remote computer system, any required software dependencies for said desired up-level patch identified by said first version number not already present in said current fix pack level at the requesting computer system; and
computer readable program code configured to dynamically combine said desired up-level patch identified by said first version number with said any required software dependencies into a single bundle, containing said desired up-level patch and said required dependencies but excluding any of said required dependencies already installed on said requesting computer system, for shipment to the requesting computer system over the electronic network.

10. The computer program product of claim 9, further comprising computer readable program code configured to add to said request said second version number of said current fix pack at the requesting computer system and the existence of requesting computer system software dependencies associated therewith.

11. The computer program product of claim 9, further comprising computer readable program code configured to store, in a memory on the requesting computer system, all currently installed fix pack levels identified by version numbers and software dependency information thereto, as java class file attributes.

12. The computer program product of claim 9, further comprising computer readable program code configured to store, in a memory on the remote computer system, available fix pack levels identified by version numbers and software dependency information thereto, as java class file attributes.

* * * * *